March 24, 1953 — F. A. LANE — 2,632,339

ADJUSTABLE ECCENTRIC MOTION

Original Filed Aug. 15, 1947

INVENTOR.
FRED A. LANE,
BY: Harold B. Hood
ATTORNEY.

Patented Mar. 24, 1953

2,632,339

UNITED STATES PATENT OFFICE 2,632,339

ADJUSTABLE ECCENTRIC MOTION

Fred A. Lane, Shelburn, Ind., assignor to Lane Motors, Incorporated, Terre Haute, Ind., a corporation of Indiana Original application August 15, 1947, Serial No. 768,803. Divided and this application January 2, 1951, Serial No. 203,964

3 Claims. (Cl. 74—600)

1

The present invention relates to an adjustable eccentric motion, and the primary object thereof is to provide novel means whereby the degree of eccentricity of a rotary driver may be varied by a simple adjustment. A further object of the invention is to make such adjusting means of such character as to be actuable during operation of the mechanism.

The invention finds its primary utility when used as a part of a motion converter for changing rotary movement into reciprocatory or oscillatory movement, and comprises means whereby the throw of the rotary input mechanism of such an assembly may be adjusted during operation.

The present application is a division of my copending application Serial No. 768,803, filed August 15, 1947, now Patent No. 2,564,982, for Oscillator Drive Mechanism.

Additional objects of the invention will appear as the description proceeds.

To the accomplishment of the above and related objects, my invention may be embodied in the form illustrated in the accompanying drawings, attention being called to the fact, however, that the drawings are illustrative only and that change may be made in the specific construction illustrated and described, so long as the scope of the appended claims is not violated.

Figure 1:
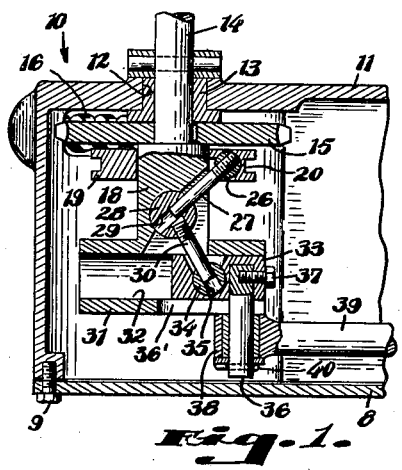
Fig. 1 is a vertical section through mechanism embodying the present invention.

Referring more particularly to the drawings, it will be seen that I have illustrated a housing 10 formed with an integral top wall 11 and an open bottom adapted to be closed by a cover plate 8 suitably secured to the housing 10 by machine screws 9, or the like, with an intervening gasket, if desired, to make the housing liquid-tight, whereby the parts to be described may, if desired, run immersed in lubricant.

An opening 12 in the housing wall 11 may mount a bushing or bearing 13 in which is journalled a shaft 14 carrying, within the housing, a worm gear 15 with which meshes a worm 16 on a power input shaft suitably journalled in the housing and driven by any desired power means.

Within the housing 10, the shaft 14 carries or is provided with, a cylindrical stem 18 upon which

Figure 2:
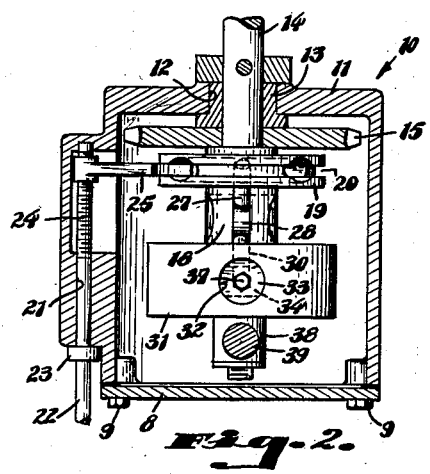
Fig. 2 is a sectional view taken from the right-hand side of Fig. 1.
Figure 3:
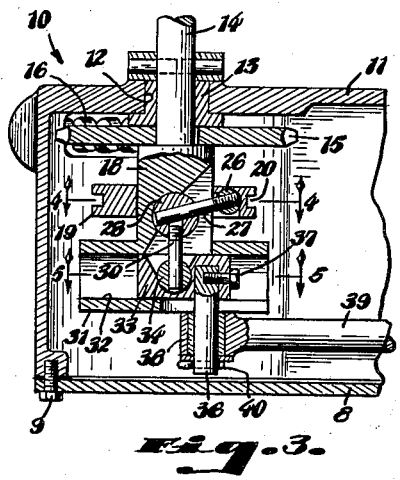
Fig. 3 is a view similar to Fig. 1 and showing the parts in a different position of adjustment.
Figure 4:
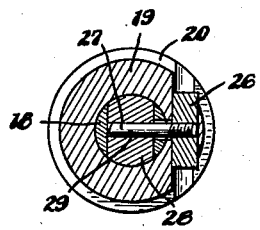
Fig. 4 is a horizontal section taken substantially on the line 4—4 of Fig. 3.
Figure 5:
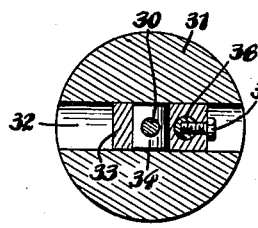
Fig. 5 is a similar section taken substantially on the line 5—5 of Fig. 3.

2 is mounted a ring 19, rotationally fixed to said stem, but capable of sliding axial movement relative thereto. The ring 19 is formed with an outwardly opening peripheral groove 20. Suitably journaled in a bore 21 in the housing, upon an axis parallel with the axis of the shaft 14, is an adjusting shaft 22 carrying a stop collar 23 and having a threaded section 24 upon which is threadedly mounted a yoke 25 whose oppositely projecting arcuate fingers are operatively received in the groove 20 of the ring 19. It will be obvious, particularly from an inspection of Fig. 2, that rotational adjustment of the shaft 22 in opposite directions will shift the ring 19 axially oppositely relative to the stem 18.

A rocker 26 is socketed in the ring 19 upon an axis tangential to a circle concentric with the shaft 14, and a pin 27 projects radially from said rocker. The structure permits oscillation of the rocker 26 and pin 27 in a plane including the axis of the shaft 14 and stem 18. A second rocker 28 is socketed in the stem 18 upon an axis parallel with the axis of the rocker 26 and perpendicularly intersecting the axis of the stem 18. Said rocker 28 is formed with a transaxial bore 29 therethrough, slidably receiving the projecting end of the pin 27. Radially projecting from the rocker 28, in the plane of the axis of the pin 27, but angularly related thereto is a pin 30.

The stem 18 carries, at its lower end, a block 31 formed with a guideway 32 which extends transaxially of the stem 18; and a block 33 is reciprocably mounted in said guideway. A rocker 34 is socketed in said block 33 for oscillation upon an axis parallel to the axes of oscillation of the rockers 26 and 28. The rocker 34 is formed with a transaxial bore 35 slidably receiving the projecting end of the pin 30.

It will be readily perceived that, as the ring 19 is moved downwardly from its illustrated position, the rockers 26 and 28 will be turned in a clockwise direction, the pin 37 sliding farther into the bore 29; whereby the pin 30 will be bodily shifted in a clockwise direction, about the axis of the rocker 28, will slide farther into the bore 35, and will bodily shift the block 33 toward the left, concurrently turning the rocker 34 in a clockwise direction in its socket.

The block 33 is socketed to receive a trunnion pin 36 which projects downwardly therefrom, through a slot 36' opening downwardly from the guideway 32, the axis of said trunnion being parallel with the axis of the shaft 14. The parts are so proportioned and designed that, when the ring 19 has been moved downwardly to the limit of its stroke, the axis of the trunnion pin 36 will coincide with the axis of the shaft 14.

The trunnion pin is fixed relative to the block 33 by a machine screw 37, or the like, preferably projecting into a socket suitably formed in said pin. Its downward extension forms a pivotal mounting for one end 38 of a pitman 39. If desired, a bushing may surround the pin 36 in the eye of said pitman end, and the pitman end may be held in place on the trunnion pin by a cotter pin 40, or the like, a washer preferably being interposed between said cotter pin and the pitman end 38.

It will thus be seen that I have provided a mechanism whereby, through manipulation of the shaft 22, and whether or not the shaft 14 is in motion, the degree of eccentricity of the trunnion 36 relative to the shaft 14 may be adjusted from a zero value to any selected value within the dimensions of the block 31.

I claim as my invention:

1. In combination, a rotor, a transaxial guideway fixed to said rotor, an element guided for movement in said guideway and provided with a connector, a member rotationally fixed but axially movably mounted on said rotor, a rocker carried by said element for oscillation upon an axis normal to a plane including the rotor axis and the line of movement of said element, a second rocker carried by said rotor for oscillation upon an axis parallel with the axis of said first-named rocker and intersecting said rotor axis, a third rocker carried by said member for oscillation about an axis parallel with the axes of said first- and second-named rockers, a pin joining said first- and second-named rockers with its axis perpendicular to the axes of said joined rockers and having a transaxially slidable connection with one of the joined rockers, and a pin joining said second and third rockers with its axis perpendicular to the axes of said joined rockers and having a transaxially slidable connection with one of the joined rockers.

2. The organization of claim 1 including means movably mounted adjacent said rotor and operatively associated with said member for axially shifting said member during rotation thereof.

3. In combination, a rotor, a transaxial guideway fixed to said rotor, an element guided for reciprocatory movement in said guideway and provided with a connector, said element having formed therein a cylindrical seat with its axis transverse to the line of movement of said element, a cylindrical rocker retained in said seat against transaxial movement relative to said element, said rocker being formed with a transaxial bore, the axis of said rocker being arranged normal to a plane including the axis of said rotor, and said seat having a peripherally-elongated radial opening therefrom registering with said rocker bore, said rotor being formed with a cylindrical seat whose axis perpendicularly intersects said rotor axis and is parallel with said rocker axis, a second cylindrical rocker retained in said rotor seat against transaxial movement relative to said rotor, said second rocker being provided with a radial socket, and said rotor seat being provided with a peripherally-elongated radial opening therefrom registering with said socket, a pin seated in said socket, traversing said openings and slidably received in said bore, said second rocker further being provided with a transaxial bore angularly related to said socket and registering with said rotor seat opening, a member rotationally fixed but axially movably mounted on said rotor, said member being provided with a cylindrical seat with its axis parallel with the axes of said element seat and said rotor seat and having a peripherally-elongated radial opening therefrom registering with said rotor opening, a third cylindrical rocker retained in said member seat against transaxial movement relative to said member and provided with a radial socket registering with said member seat opening, a pin seated in said third rocker socket, traversing said member seat openining and said rotor seat opening and slidably received in said second rocker bore, and means for shifting said member axially relative to said rotor.

FRED A. LANE.

REFERENCES CITED

The following references are of record in the file of this patent:

UNITED STATES PATENTS

| Number | Name | Date |
|---|---|---|
| 2,033,639 | Lotts | Mar. 10, 1936 |

FOREIGN PATENTS

| Number | Country | Date |
|---|---|---|
| 325,915 | Germany | Sept. 20, 1920 |
| 246,644 | Great Britain | Feb. 4, 1926 |